July 15, 1941.  H. NEALE  2,249,030
ELECTRIC ACCUMULATOR
Filed Jan. 26, 1940
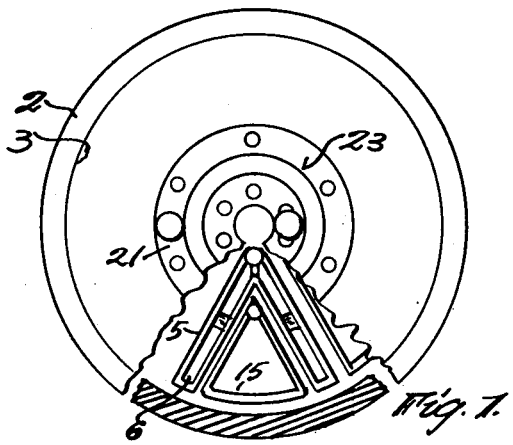
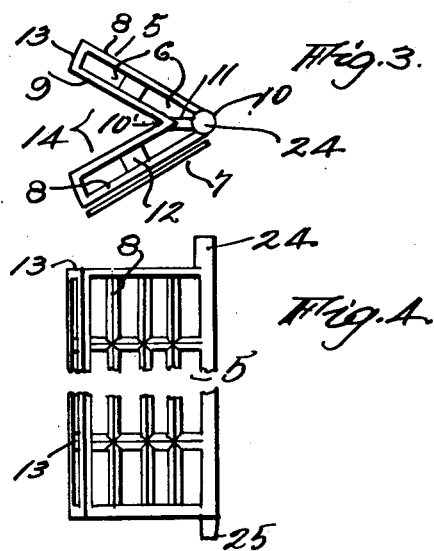
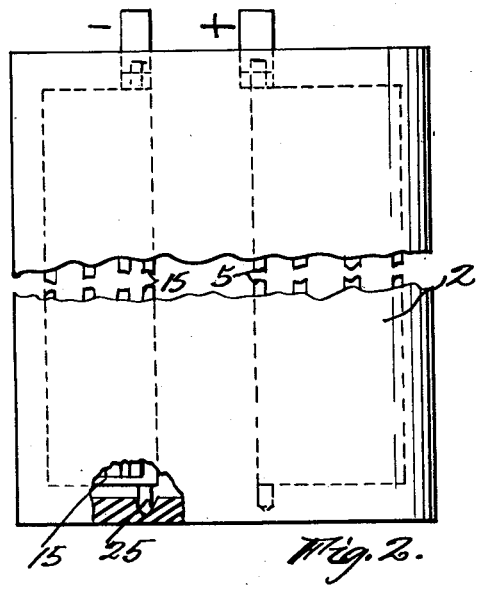
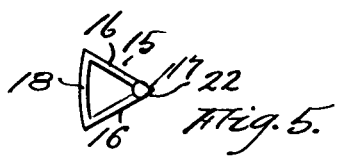
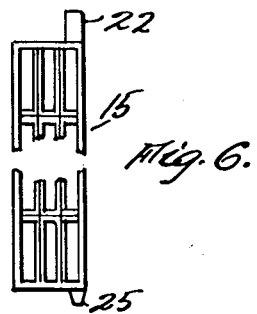
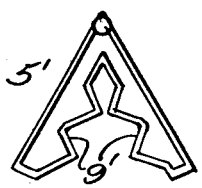
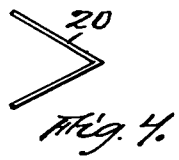
Inventor,
Herbert Neale;
By his Atty.
Frederick E. Maynard.

Patented July 15, 1941

2,249,030

UNITED STATES PATENT OFFICE 2,249,030

ELECTRIC ACCUMULATOR

Herbert Neale, Los Angeles, Calif.

Application January 26, 1940, Serial No. 315,774

2 Claims. (Cl. 136—6)

This invention is an electric accumulator or commonly termed "storage" battery.

It is one aim of the invention to provide a small and compact battery of this class more especially intended for use with handy, portable flash lights; though it is not to be considered as limited to this field.

Another object is to provide secondary battery of cylindrical casing shape and to provide an assembly of positive and negative plates or grid elements designed, constructed and arranged to effect a high grid area exposure to the electrolyte and to reduce space loss in the chamber of the case to the least practical minimum.

A further object is to provide a novel and effective cylindrical cluster of elements including a circle of positive elements and a circle of negative elements each having a common center in the casing, and each hollow.

An additional object of the invention is to provide an element in the form of a hollow structure whereby to obtain a bore or internal cavity defined by the wall of the tube for the effective holding of a considerable thickness of the desired metallic paste whereby to effect the incorporation of a considerable body or mass of the paste with a resultant long discharge life of a battery of this type as distinguished from the shortness of life had by batteries in which the thickness of the paste mass is determined by the thickness of a thin, reticulated grid plate, which while giving a high ampere discharge because of facial area has no such life capacity as is afforded by a large body of the paste as a reserve for maintaining discharge of current. This is especially desirable where the battery is to be used as for very low ampere bulbs where a hollow structure type element as here set forth will even in a very small battery have ample surface to discharge the needed volume of current; the said hollow structure constituting a vessel for holding a much greater charge of paste than can be contained in the window space of a reticulated plate having the same weight of lead. While a reticulated plate may present a larger discharge area to the electrolyte than this hollow element it, at the same time, discharges the current so fast that the life of the battery is much shorter than the hollow element of this invention.

To effect compactness of element grouping in the case of the battery an object is to provide elements which are hollow and are of segmental form as to the axis of the cylindric battery so that the elements may be most efficiently set in circle arrangement as to the axis. More in detail an object is to provide a grid element whose wall is V-shaped in end view and is hollow to provide a chamber; that is, is composed of an inner sheet and an outer sheet in spaced relation to form the cavity, and each sheet of the wall being reticulated for exposure of the paste mass, oxide of lead for instance, in the tube. And further, an object is to provide a nesting element of sectoral form in end plan and is complementary to the valley of the V-section element above set forth.

The invention consists in certain advancements in this art as set forth in the ensuing disclosure and having, with the above, additional objects and advantages as hereinafter developed, and whose constructions, combinations and details of means, and the manner of operation will be made manifest in the description of the herewith illustrative embodiment; it being understood that modifications, variations and adaptations may be resorted to within the scope, principle and spirit of the invention as it is more particularly claimed hereinbelow.

Figure 1 is a broken-away axial plan of the battery.

Figure 2 is a broken-away side elevation of the battery.

Figure 3 is an axial plan of one of the hollow V-section elements.

Figure 4 is a side elevation of the element of Fig. 3, longitudinally broken.

Figure 5 is an axial plan of the sector or nesting element.

Figure 6 is a side elevation of the element of Fig. 5.

Figure 7 is an axial plan of a V-section separator to nest between the inner or V-section element and its nested, outer sector element.

As here shown an insulative case 2 has a cylindrical chamber 3, though the case and the chamber may be of other form if so desired. Complementary to the wall of the chamber or cell 3 there is an inner cluster of grid elements 5 disposed in a circle, Fig. 1, about the axis of the case.

Each of the elements 5 is of hollow form to provide an elongate cavity 6 to be filled with any suitable metallic salt or other current storing agent (not shown), and the element wall being foraminous or reticulate for the exposure of the pack of paste in the tube space or cavity.

In small storage batteries for use with portable or hand flash lights it is desirable to obtain maximum plate and paste volume and to this end the element 5 is more or less of sectoral form so that a number can be grouped in circle arrangement about the axis of the battery with the radial faces, that is the outermost faces which converge, lying parallel and spaced by a suitable separator device 7, Fig. 3 The divergent walls of the element 5 are clearly shown in Fig. 3 as being of hollow structure to provide the cavity 6; each wall including an outer sheet 8 and a parallel, valley-side sheet 9, all generally converging toward the axis of the case. The outer sheets 8—8 meet at an inner apex 10 and the valley-side sheets meet at apex 10' radially outward from apex 10. For strength these apices are joined by radial ties 11 at suitable points, and the sheets 8 are joined by suitable ties 12 to the valley sheets 9; all to reinforce the grid work of the element 5.

The radial extremities of the wall forming sheets of the grid element 5 have cross ties connecting the sheets at 13. It will be seen therefore, that by such a V-shaped, cross-section of element as is shown in Fig. 3 there is formed a longitudinal, wide-mouthed valley, or more properly vertical channel 14 from top to bottom of the element when set in a battery case 2.

The capacity of the battery is increased by the provision of an outer grid element 15 of tubular structure of such cross-section as to substantially fit and fill the valley 14 of a relative inner element 5. Element 15 is of sectoral shape and has divergent side sheets 16 radiating from apex 17 and which are connected by arc-sheet 18 at the distal extremities; the arc being preferably in the same circle as the distal edges of the hollow side walls of the circular group of elements 5 so that all of the elements 5 and 15 are radial as to a common center on the axis of the case and all lie inside a circle spaced in from and concentric to the chamber wall of the case 2. The longitudinal cavity of the nesting tubular element 15 is filled with the oxide mud and this is exposed at the outer faces of the foraminous sheets or wall-forming parts of the sectoral element 15.

It will be seen that the element 5 is of V-cross-section with hollow divergent walls each formed by an inner sheet and a spaced outer sheet; both of grid work structure for mud reinforcement and face exposure.

The inner element 5 may be spaced from its nested companion outer element 15 in any suitable manner, as by a V-section insulator 20, Fig. 7.

The circle of outer elements 15 is connected into one electrical unit as by means of a bus ring 21 fixed onto tip posts 22 of the several elements of the outer group, and in a like manner the inner elements 5 are fixed to a common bus ring 23 mounted on the respective posts 24 of the ring of elements 5.

The several elements 5 and 15 have toes 25 holding in the bottom of the case 2.

In Fig. 8 the V-channel, tubular wall grid 5' has its inner or channel wall 9' longitudinally corrugated to bring a part of its surface more deeply into the core of oxide mud charge in a battery to facilitate infiltration of the electrolyte in cases where the valley tube grid 15 may be eliminated.

What is claimed is:

1. In an electric battery, a hollow grid plate having reticulated walls and said plate having a generally V-shaped cross-section and the valley side being longitudinally open for unobstructed reception of a complementary member; the valley rims being closed and the apex of the outer wall and the apex of the inner wall being joined longitudinally so that the chamber of the hollow plate is closed at the apices and at the valley rims.

2. The plate as in claim 1, the inner valley panels of the plate being longitudinally corrugated.

HERBERT NEALE.